United States Patent
Kawano et al.

(10) Patent No.: US 11,368,411 B2
(45) Date of Patent: Jun. 21, 2022

(54) COMMUNICATION SYSTEM AND BANDWIDTH CONTROL METHOD

(71) Applicant: Nippon Telegraph and Telephone Corporation, Tokyo (JP)

(72) Inventors: Shinya Kawano, Tokyo (JP); Katsuma Miyamoto, Tokyo (JP); Akihiro Kimura, Tokyo (JP); Akihiro Okada, Tokyo (JP); Hiroaki Sato, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/044,874

(22) PCT Filed: Apr. 2, 2019

(86) PCT No.: PCT/JP2019/014669
§ 371 (c)(1),
(2) Date: Oct. 2, 2020

(87) PCT Pub. No.: WO2019/194190
PCT Pub. Date: Oct. 10, 2019

(65) Prior Publication Data
US 2021/0105227 A1    Apr. 8, 2021

(30) Foreign Application Priority Data
Apr. 5, 2018 (JP) .............................. JP2018-073385

(51) Int. Cl.
*H04L 12/911* (2013.01)
*H04L 12/28* (2006.01)
(Continued)

(52) U.S. Cl.
CPC ........ *H04L 47/822* (2013.01); *H04L 12/2898* (2013.01); *H04L 2012/5636* (2013.01)

(58) Field of Classification Search
CPC .............. H04L 47/822; H04L 12/2898; H04L 2012/5636
(Continued)

(56) References Cited

U.S. PATENT DOCUMENTS 6,330,603 B1 * 12/2001 Seki ...................... H04L 47/724
709/223
2021/0092067 A1 * 3/2021 Monma ............... H04L 41/5067

FOREIGN PATENT DOCUMENTS

WO    WO 2019/026837    2/2019

OTHER PUBLICATIONS

Jpn.nec.com, [online], "vCPE Virtualized Customer Premises Equipment," 2018, retrieved on Feb. 27, 2018, retrieved from URL<http://jpn.nec.com/tcs/vcpe/index.html>, 7 pages (with English Translation).
(Continued)

*Primary Examiner* — Ricky Q Ngo
*Assistant Examiner* — Ellen A Kirillova
(74) *Attorney, Agent, or Firm* — Fish & Richardson P.C.

(57) ABSTRACT

In a communication system including first virtual CPE and second virtual CPE, the first virtual CPE includes a band acquisition unit configured to acquire a first contract band set for a subscriber under control of the first CPE and acquire a value of decrease in the first contract band when at least one subscriber terminal of the subscriber transitions from being under control of the first CPE to being under control of the second CPE, and a band control unit configured to control a communication band for the first CPE, and the second virtual CPE includes a band acquisition unit configured to acquire a second contract band set for a subscriber under control of the second CPE and acquire a value of
(Continued)

AFTER TRANSITION OF SUBSCRIBER TERMINAL C increase in the second contract band, and a band control unit configured to control a communication band for the second CPE.

6 Claims, 10 Drawing Sheets

(51) Int. Cl.
*H04L 47/70* (2022.01)
*H04L 12/70* (2013.01)

(58) Field of Classification Search
USPC .......................................................... 709/226
See application file for complete search history.

(56) References Cited

OTHER PUBLICATIONS

Juniper.net, [online], "Enterprise Managed Services Offerings—Controlling End Users with Virtual CPE," 2018, retrieved on Feb. 27, 2018, retrieved from URL<https://www.juniper.net/jp/jp/solutions/nfv/vcpe/>, 7 pages (with English Translation).

\* cited by examiner

Fig. 1A BEFORE TRANSITION OF SUBSCRIBER TERMINAL C

Fig. 1B AFTER TRANSITION OF SUBSCRIBER TERMINAL C

| CONTRACT ID | PASSWORD | VIRTUAL CPE ID | VIRTUAL CPE ADDRESS |
|---|---|---|---|
| ID 1 | PW1 | VIRTUAL CPE_ID 1 | VIRTUAL CPE_IP 1 |
| ID 2 | PW2 | VIRTUAL CPE_ID 2 | VIRTUAL CPE_IP 2 |
| ID 3 | PW3 | VIRTUAL CPE_ID 3 | VIRTUAL CPE_IP 3 |
| : | : | : | : |

Fig. 4

| CONTRACT ID | CONTRACT BAND |
|---|---|
| ID 1 | BW1 |
| ID 2 | BW2 |
| ID 3 | BW3 |
| : | : |

| BAND | ADDITION/DELETION | START TIME | END TIME |
|---|---|---|---|
| 1000 Mbps | 0 (CONTRACT BAND) | 0000 00/00 00:00:00 | 0000 00/00 00:00:00 |
| 500 Mbps | 2 (DELETION) | 2018 03/01 00:00:00 | 2018 03/02 00:00:00 |
| 200 Mbps | 1 (ADDITION) | 2018 03/01 12:00:00 | 2018 03/02 12:00:00 |
| : | : | : | : |

| CONTRACT ID | BAND | ADDITION/DELETION | START TIME | END TIME |
|---|---|---|---|---|
| ID 1 | 1000 Mbps | 0 (CONTRACT BAND) | 0000 00/00 00:00:00 | 0000 00/00 00:00:00 |
| ID 1 | 500 Mbps | 2 (DELETION) | 2018 03/01 00:00:00 | 2018 03/02 00:00:00 |
| ID 1 | 200 Mbps | 1 (ADDITION) | 2018 03/01 12:00:00 | 2018 03/02 12:00:00 |
| ID 2 | 1000 Mbps | 0 (CONTRACT BAND) | 0000 00/00 00:00:00 | 0000 00/00 00:00:00 |
| ID 2 | 200 Mbps | 2 (DELETION) | 2018 03/03 00:00:00 | 2018 03/04 00:00:00 |
| .. | .. | .. | .. | .. |

COMMUNICATION SYSTEM AND BANDWIDTH CONTROL METHOD

CROSS-REFERENCE TO RELATED APPLICATIONS

This application is a National Stage application under 35 U.S.C. § 371 of International Application No. PCT/JP2019/014669, having an International Filing Date of Apr. 2, 2019, which claims priority to Japanese Application Serial No. 2018-073385, filed on Apr. 5, 2018. The disclosure of the prior application is considered part of the disclosure of this application, and is incorporated in its entirety into this application.

TECHNICAL FIELD

The present invention relates to a communication system and a band control method.

BACKGROUND ART

In order for a terminal to connect to the Internet, it is generally necessary to connect a line of a communication service provider. In line connection of communication service providers, more flexible connection services are required. In order for communication service providers to realize flexible and timely service provision, virtual customer premises equipment (vCPE) that provides functions of customer premises equipment (CPE) provided in a user's home using a virtualized server has been examined (see NPLs 1 and 2).

According to the virtual CPE, it is possible to provide a part of functions (such as address allocation and address translation) of a Home GateWay (HGW) and the like in a server on a network of a communication service provider, and it is possible to provide new network functions to the CPE without exchanging the CPE.

CITATION LIST

Non Patent Literature

NPL 1: NEC, vCPE virtualized Customer Premises Equipment, Internet, URL <http://jpn.nec.com/tcs/vcpe/index.html>, retrieved on Mar. 9, 2018

NPL 2: JUNIPER, Virtualized CPE-Juniper Networks, Internet, URL <https://www.juniper.net/jp/jp/solutions/nfv/vcpe/>, retrieved on Mar. 9, 2018

SUMMARY OF THE INVENTION

Technical Problem

In line connection of a communication service provider, a subscriber connects to a network of the communication service provider through line authentication of the communication service provider. At the line authentication, the communication service provider checks service conditions for each subscriber and sets a communication band in a transfer apparatus (such as a router) on the network. However, it is difficult to immediately apply the settings in the transfer apparatus on the network and to flexibly change a communication band.

Even in a case in which virtual CPE is used, a communication band is set on the network in line connection between the CPE and the virtual CPE. In other words, a communication band is set independently for each subscriber.

In such a scheme in which a communication band is set for each subscriber, it is difficult to flexibly change a communication band when a subscriber terminal under control of a certain CPE transitions to under control of other CPE.

An object of the present invention is to realize a flexible change in communication band when a subscriber terminal under control of a certain CPE transitions to under control of another CPE.

Means for Solving the Problem

According to an aspect of the present invention, there is provided a communication system including: first virtual customer premises equipment (CPE) capable of providing a network function to a first CPE; and A second virtual CPE capable of providing a network function to a second CPE, in which the first virtual CPE includes a band acquisition unit configured to acquire a first contract band set for a subscriber under control of the first CPE and acquires a value of decrease in the first contract band when at least one subscriber terminal of the subscriber transitions from being under control of the first CPE to being under control of the second CPE, and a band control unit configured to control a communication band for the first CPE using a band value obtained by subtracting the value of decrease from the first contract band, and the second virtual CPE includes a band acquisition unit configured to acquire a second contract band set for a subscriber under control of the second CPE and acquire a value of increase in the second contract band corresponding to the value of decrease in the first contract band, and a band control unit configured to control a communication band for the second CPE using a band value obtained by adding the value of increase to the second contract band.

According to an aspect of the present invention, there is provided a band control method in a communication system including first virtual customer premises equipment (CPE) capable of providing a network function to a first CPE and a second virtual CPE capable of providing a network function to a second CPE, the method including: acquiring, at the first virtual CPE, a first contract band set for a subscriber under control of the first CPE and acquiring a value of decrease in the first contract band when at least one subscriber terminal of the subscriber transitions from being under control of the first CPE to being under control of the second CPE; controlling, at the first virtual CPE, a communication band for the first CPE using a band value obtained by subtracting the value of decrease from the first contract band; acquiring, at the second virtual CPE, a second contract band set for a subscriber under control of the second CPE and acquiring a value of increase in the second contract band corresponding to the value of decrease in the first contract band; and controlling, at the second virtual CPE, a communication band for the second CPE using a band value obtained by adding the value of increase to the second contract band.

Effects of the Invention

According to the present invention, it is possible to realize flexible changes in communication band when a subscriber terminal under control of a certain CPE transitions to under control of another CPE.

DESCRIPTION OF EMBODIMENTS

Hereinafter, an embodiment of the present invention will be described with reference to drawings.

Configuration of Communication System

Figure 1A:
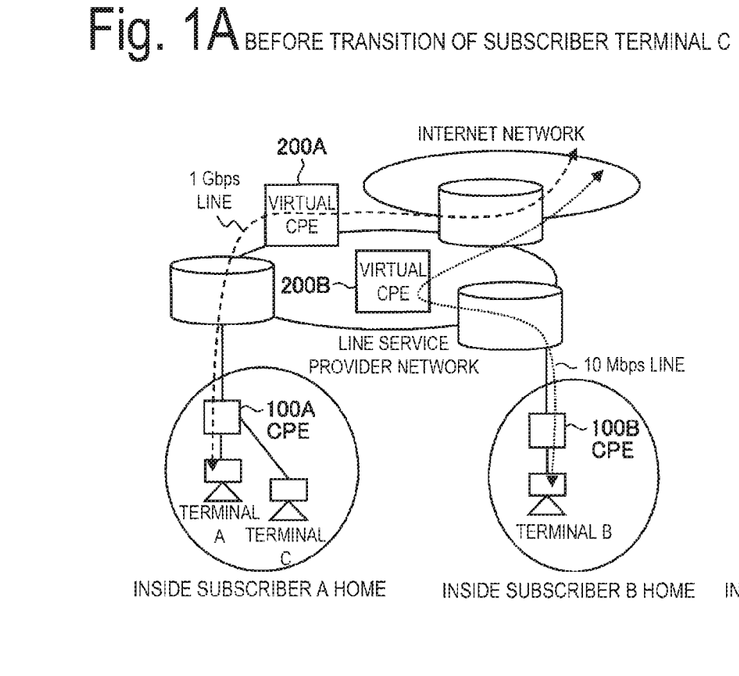
FIGS. 1A and 1B are diagrams illustrating an application example of the present invention.
Figure 1B:
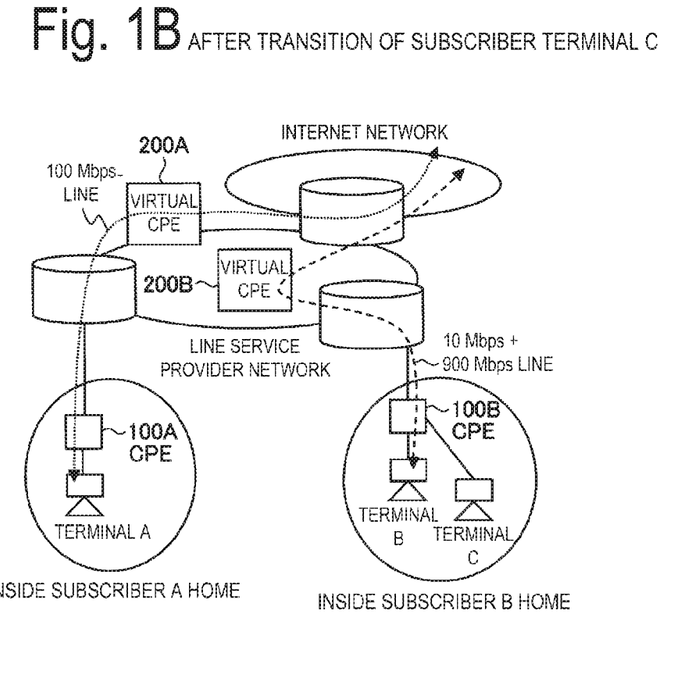

FIGS. 1A and 1B are diagrams illustrating an application example of the present invention. In the embodiment of the present invention, an example in which a subscriber terminal under control of a certain CPE transitions to under control of another CPE will be described.

FIG. 1A illustrates a communication band when subscriber terminals A and C are connected to CPE 100A of a subscriber A and a subscriber terminal B is connected to CPE 100B of a subscriber B. The subscriber terminals A and C are connected to the Internet via the CPE 100A and virtual CPE 200A, and a contract band thereof is 1 Gbps. The subscriber terminal B is connected to the Internet via the CPE 100B and virtual CPE 200B, and a contract band thereof is 10 Mbps. As illustrated in FIG. 1B, if the subscriber terminal C with high band occupancy transitions to under control of CPE of the subscriber B, a band of 10 Mbps that is the contract band of the subscriber B becomes insufficient, and it is not possible to receive sufficient services under control of the CPE 100B.

A scheme that makes it possible to receive sufficient services even in the case in which the subscriber terminal C transitions to under control of the CPE 100B by performing setting such that 900 Mbps in 1 Gbps of the contract band of the subscriber A can be temporarily used while under control of the CPE 100B in such a case will be described. Note that the band under control of the CPE 100A is limited to 100 Mbs obtained by subtracting 900 Mbps from 1 Gbps.

In the example of the present invention, band control using a transfer apparatus (such as a router) on the network is not required, and pieces of virtual CPE perform band control. In other words, flexible band control is realized by the pieces of virtual CPE sharing band information and performing band control at each of the pieces of virtual CPE.

Figure 2:
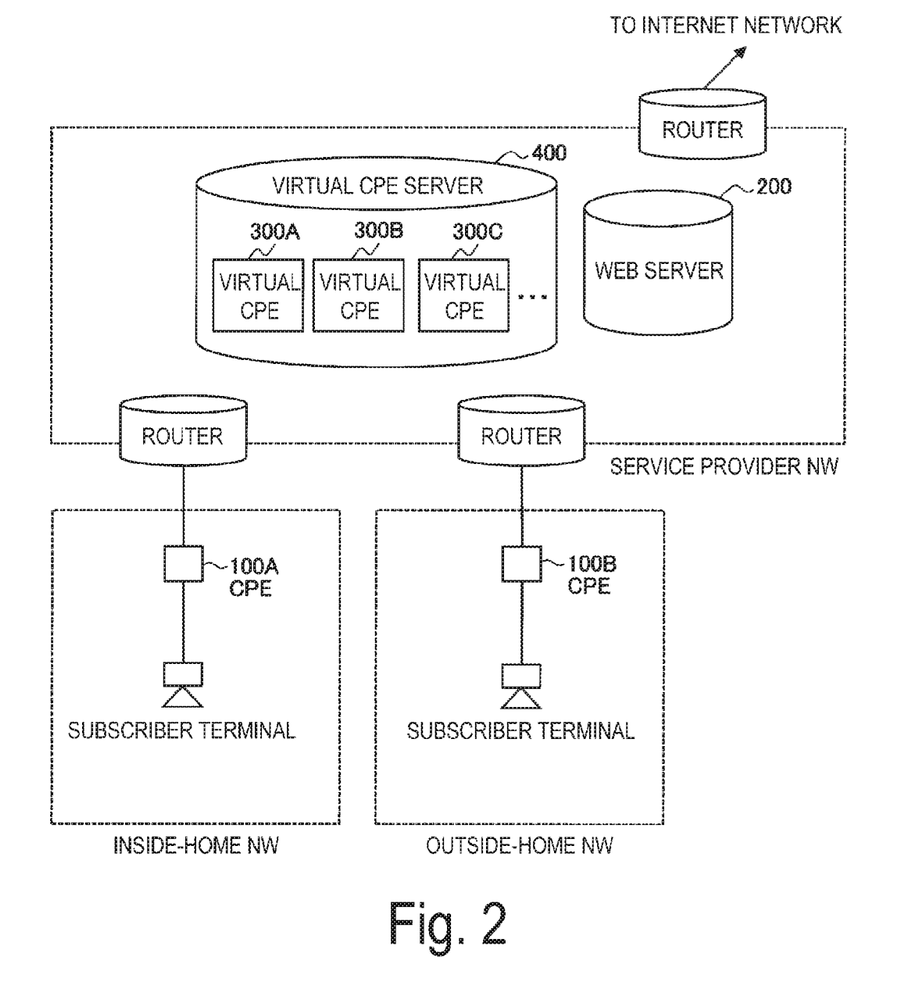
FIG. 2 is an overall configuration diagram of a communication system according to an embodiment of the present invention.

FIG. 2 is an overall configuration diagram of a communication system according to an embodiment of the present invention. The communication system according to the embodiment of the present invention has the pieces of CPE 100A and 100B, a web server 200, and a virtual CPE server 400. The virtual CPE server 400 includes one or a plurality of pieces of virtual CPE 300A, 300B, 300C, . . . (hereinafter, collectively referred to as pieces of virtual CPE 300). Note that a plurality of virtual CPE servers 400 may be present and the pieces of virtual CPE 300 may be provided in the plurality of virtual CPE servers 400 in any fashion.

The pieces of CPE 100A and 100B are communication equipment such as a home gateway, a router, or a modem placed in homes of the subscribers A and B, respectively. The CPE 100A is in a network of his/her home for the subscriber A, and the CPE 100B is a network outside his/her home. The pieces of CPE 100A and 100B can accommodate one or a plurality of subscriber terminals. Also, the pieces of CPE 100A and 100B have a function of connecting tunnels to the pieces of virtual CPE 300. Note that one CPE can also connect to tunnels for a plurality of pieces of virtual CPE. In a case in which two network functions, namely an address allocation function and an address translation function are provided by two pieces of virtual CPE, for example, one CPE may set tunnels to the two pieces of virtual CPE.

The web server 200 is a server configured to manage subscriber contract information and band information and receives values of increase/decrease in contract band when subscriber terminals of subscribers transition to under control of other pieces of CPE, application periods during which contract bands are to be changed, and the like.

Figure 3:
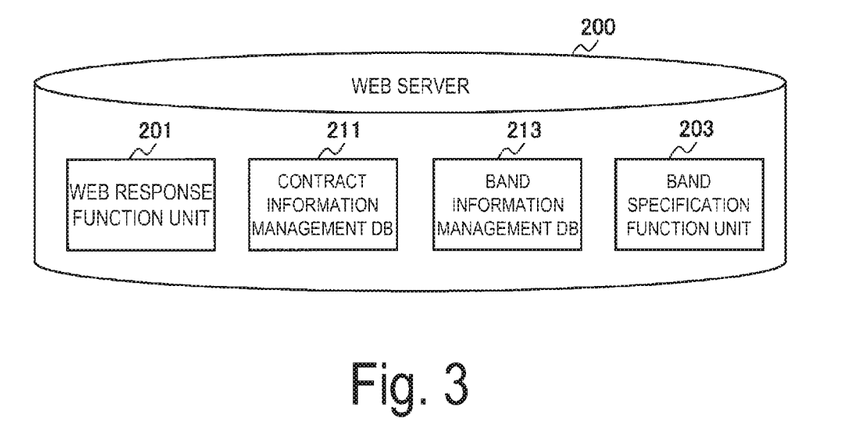
FIG. 3 is a diagram illustrating a configuration example of a web server.

FIG. 3 is a diagram illustrating a configuration example of the web server 200. The web server 200 has a web response function unit 201 and a band specification function unit 203 and also has a contract information management DB 211 and a band information management DB 213 as storage units.

Figure 4:
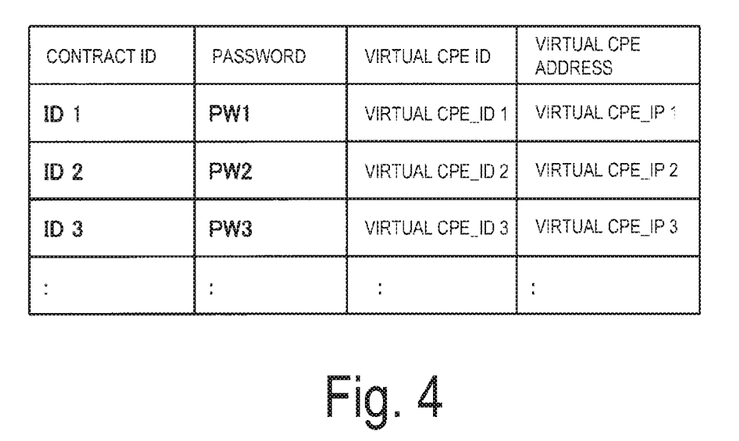
FIG. 4 is an example of information managed in a contract information management DB.

The contract information management DB 211 is a storage unit configured to manage subscriber contract information. As illustrated in FIG. 4, the contract information management DB 211 manages contract IDs and passwords for the subscribers to access the web server 200, virtual CPE IDs that are identifiers of pieces of virtual CPE that the subscribers use, and virtual CPE addresses that are addresses of the pieces of virtual CPE.

Figure 5:
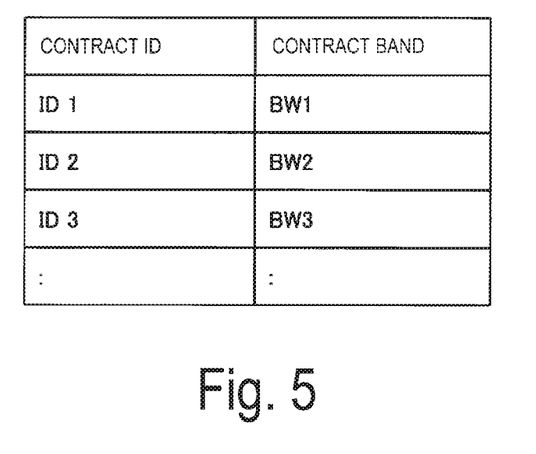
FIG. 5 is an example of information managed in a band information management DB.

The band information management DB 213 is a storage unit configured to manage subscriber contract bands. As illustrated in FIG. 5, the band information management DB 213 manages the subscriber contract bands in association with the contract IDs.

The web response function unit 201 accepts accesses from subscriber terminals and receives IDs of pieces of virtual CPE of transition destinations, values of increase/decrease of contract bands from subscriber terminals (bands to be added, bands to be deleted), application periods (start times, end times) during which contract bands are changed, and the like. Note that the application periods are optional items, a case in which no start time is present may mean that a contract band is to be immediately changed, and a case in which no end time is present may mean that the changed band is not to be restored, for example.

The band specification function unit 203 notifies the values of increase/decrease of contract bands received from subscriber terminals, the application periods, and the like to pieces of virtual CPE that are transition sources and pieces of virtual CPE that are transition destinations.

The pieces of virtual CPE (pieces of virtual CPE that are transition sources and pieces of virtual CPE that are transition destinations) 300 are virtual environments on the virtual CPE servers 400 capable of providing network functions (such as address allocation and address translation) to the pieces of CPE. The pieces of virtual CPE 300 have functions of terminating tunnels from the pieces of CPE. Also, the pieces of virtual CPE 300 have functions of acquiring, from the web server 200, contract bands, values of increase/decrease in contract bands, application periods, and the like and controlling communication bands for the pieces of CPE.

Figure 6:
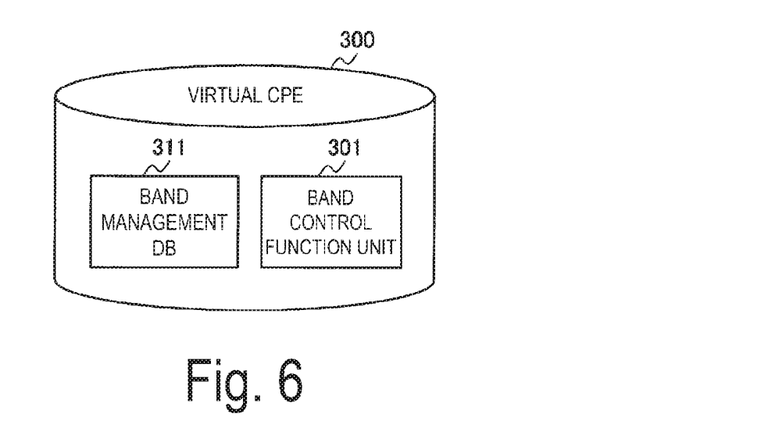
FIG. 6 is a diagram illustrating a configuration example of virtual CPE.

FIG. 6 is a diagram illustrating a configuration example of virtual CPE 300. The virtual CPE 300 has a band control function unit 301 and also has a band management DB 311 as a storage unit.

Figure 7:
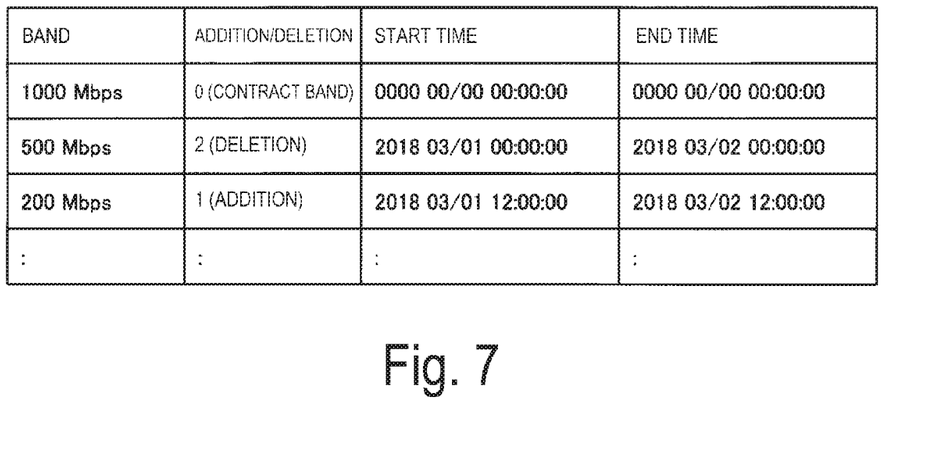
FIG. 7 is an example of information managed in a band management DB.

The band management DB 311 is a storage unit configured to manage subscriber contract bands and manage the values of increase/decrease in contract bands, application periods, and the like notified from the web server 200. As illustrated in FIG. 7, the band management DB 311 manages bands (contract bands, bands to be added, and bands to be deleted) used to control communication bands for the pieces of CPE, addition/deletion indicating which of contract bands, bands to be added, and bands to be deleted corresponding bands are, and start times and end times of application periods during which contract bands are changed, in a case in which the pieces of virtual CPE 300 provide network functions to a plurality of pieces of CPE, the band management DB 311 manages a band, addition/deletion, a start time, and an end time for each contract ID.

The contract band can be acquired in advance from the band information management DB 213 of the web server 200. Although the start time and the end time of the contract band is temporarily set to "0000 00/00 00:00:00", the start time and the end time may not be set. In order to distinguish the contract band from the band to be added and the band to be deleted, "0" is set in addition/deletion. Addition/band, the start time, and the end time are set in accordance with values of increase/decrease in contract band and the application period notified from the web server 200.

The band control function unit 301 refers to the contract band for which "0 (contract band)" is set in addition/deletion in the band management DB 311 and controls a communication band for each CPE through rate limiting, shaping, or the like. Also, the band control function unit 301 controls the communication band for the CPE using a band value obtained by changing the contract band by the value of increase/decrease during the application period from the start time to the end time. Specifically, when the start time of the band management DB 311 is reached, band information is added to the contract band if "1 (addition)" is set in addition/deletion, or the band information is subtracted from the contract band if "2 (deletion)" is set in addition/deletion, and the band value obtained by addition/subtraction is used to control the communication band. When the end time is reached, the communication band is controlled by restoring the band value obtained by addition/deletion to the original value. As described above, the band control function unit 301 may immediately change the contract band (at the timing at which the value of increase/decrease in contract band is received from the web server 200) in a case in which no start time is present, or the changed band may not be restored to the original value in a case in which no end time is present.

Operation Sequence

Figure 8:
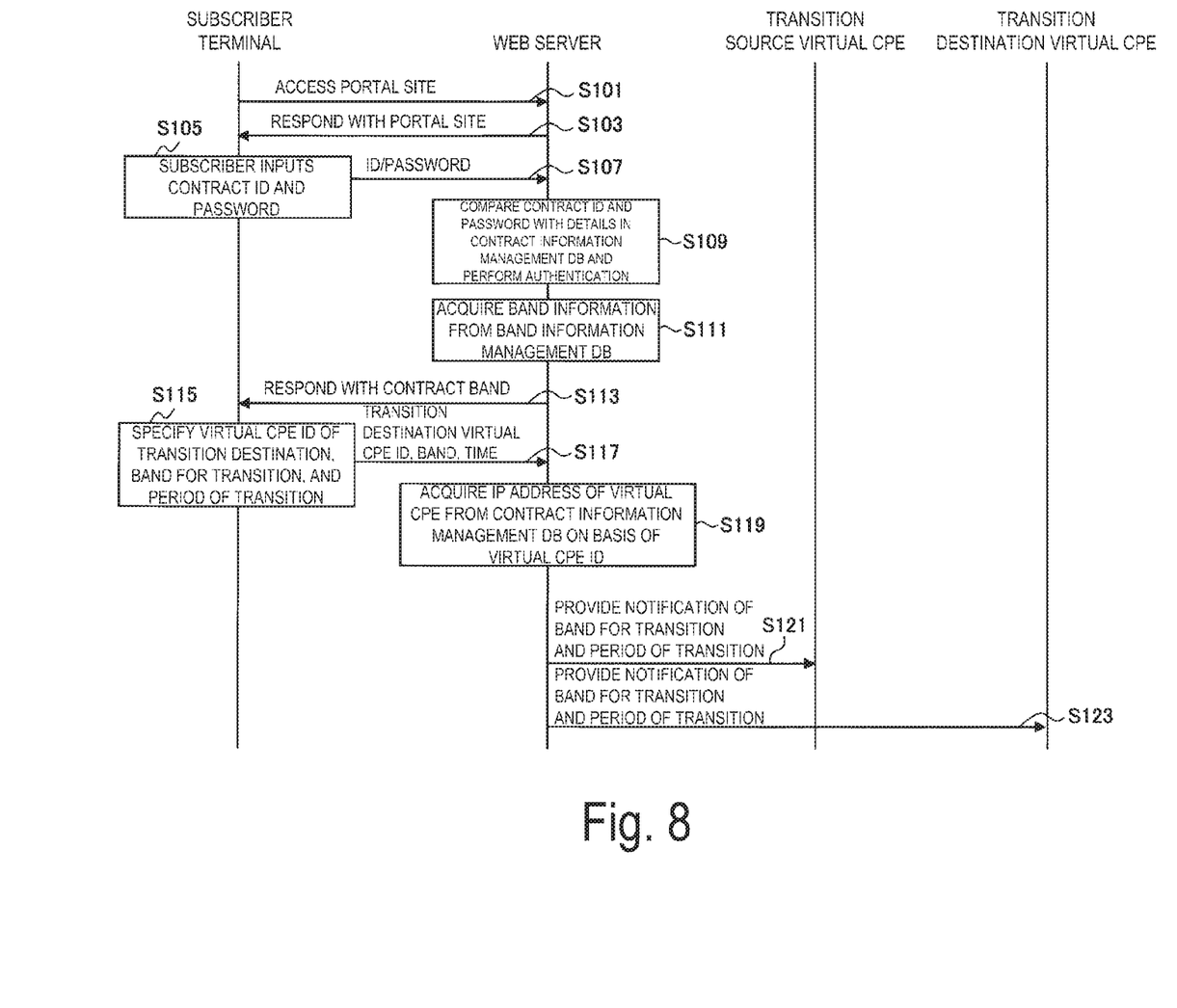
FIG. 8 is a diagram illustrating a sequence of operations in the communication system according to the embodiment of the present invention.

FIG. 8 is a diagram illustrating a sequence of operations in the communication system according to the embodiment of the present invention.

The web response function unit 201 of the web server 200 receives an access request from a subscriber terminal through Hypertext Transfer Protocol Secure (HTTPS) or the like (S101) and responds with a portal site (S103).

The subscriber terminal transmits a contract ID and a password input by the subscriber to the web server 200 (S105, S107).

The web response function unit 201 of the web server 200 compares the contract ID and the password received from the subscriber terminal with details in the contract information management DB 211 (S109), and acquires band information from the band information management DB 213 in a case in which the contract ID and the password conform to the details (S111), or respond with a contract band and the like to the subscriber terminal (S113). In a case in which the contract ID and the password do not conform to the details, the web response function unit 201 may encourage the subscriber to input the contract ID and the password again or may refuse the access request.

The subscriber terminal designates a virtual CPE ID that is a transition destination, a band for the transition, and a period of the transition and transmits such information to the web server 200 (S115, S117).

The band specification function unit 203 of the web server 200 acquires addresses of pieces of virtual CPE that are a transition source and a transition destination from the contract information management DB 211 (S119). Specifically, the band specification function unit 203 refers to the contract information management DB 211 and acquires an address of the virtual CPE that is a transition source corresponding to the contract ID received in Step S107. In addition, the band specification function unit 203 acquires an address of the virtual CPE that is a transition destination corresponding to the virtual CPE ID that is a transition destination received in Step S117.

The band specification function unit 203 of the web server 200 uses Simple Object Access Protocol Application Programming Interface (SOAP API) or the like to notify the band for transition (band to be deleted) and the period of transition (the start time and the end time) to the virtual CPE that is a transition source (S121). The band management DB 311 of the virtual CPE that is a transition source manages the band for transition and the period of the transition. The band control function unit 301 of the virtual CPE that is a transition source subtracts the band for transition (band to be deleted) from the contract band and controls the communication band using the band value obtained by the subtraction when the start time of the band management DB 311 is reached. The band control function unit 301 of the virtual CPE that is a transition source restores the band to be deleted value to the original value and controls the communication band when the end time is reached.

The band specification function unit 203 of the web server 200 uses SOAP API or the like to notify the band for transition (band to be added) and the period of transition (the clock start time and the end time) to the virtual CPE that is a transition destination (S123). The band management DB 311 of the virtual CPE that is a transition source manages the band for transition and the period of transition. The band control function unit 301 of the virtual CPE that is a transition destination adds the band for transition (band to be added) to the contract band and controls the communication band using the band value obtained by the addition when the start time of the band management DB 311 is reached. The band control function unit 301 of the virtual CPE that is a transition destination restores the band value obtained by the addition to the original value and controls the communication band when the end time is reached.

Note that although the band for transition (band to be deleted) in Step S121 is typically the same as the band for transition (band to be added) in Step S123, the band to be deleted may be different from the band to be added. In a case in which service quality for the subscriber A and service quality for the subscriber B in FIGS. 1A and 1B are different from each other, for example, the band to be added may be calculated from the band to be deleted in consideration of the service quality.

Modification Example

Although the example in which the band management DB 311 of the virtual CPE 300 manages the values of increase/decrease in contract bands, application periods, and the like in the aforementioned embodiment, the band information management DB 213 of the web server 200 may manage the values of increase/decrease in contract bands, application periods, and the like.

Although the functional configuration of the web server 200 is basically the same as that in FIG. 3, the following points are different.

Figure 9:
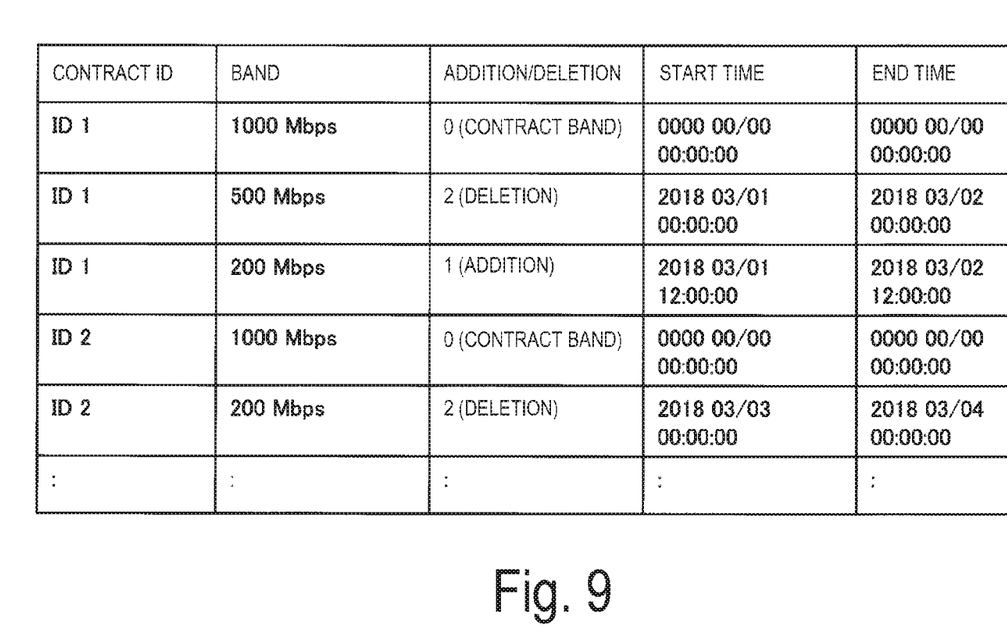
FIG. 9 is an example (modification example) of information managed in the band information management DB.

The band information management DB 213 manages bands (contract bands, bands to be added, and bands to be deleted) indicating contract bands and values of increase/decrease, addition/deletion indicating which the contract bands, bands to be added, and bands to be deleted corresponding bands are, and start times and end times of application periods during which contract bands are changed in an associated manner with contract IDs as illustrated in FIG. 9. In this manner, the band information management DB 213 manages information, which is managed by the band management DB 311 of the virtual CPE 300 in the aforementioned embodiment.

If the band specification function unit 203 adds band information to the contract band if "1 (added)" is set in addition/deletion, or subtracts the band information from the contract band if "2 (deleted)" is set in addition/deletion, and notifies the band value obtained by addition/deletion to the virtual CPE 300 when the start time of the band information management DB 213 is reached. When the end time is reached, the band value restored to the original value is notified to the virtual CPE 300.

Figure 10:
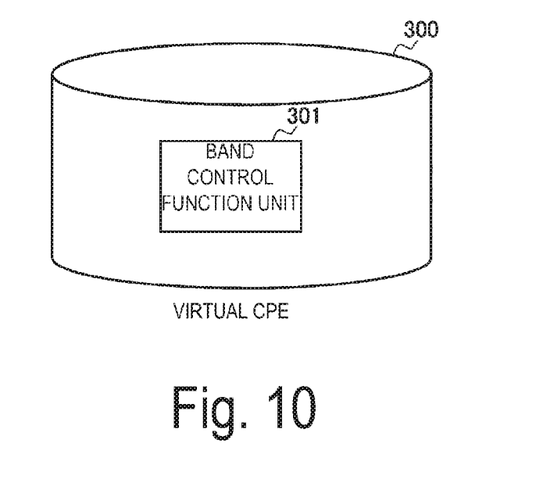
FIG. 10 is a diagram (modification example) illustrating a configuration example of virtual CPE.

FIG. 10 is a diagram illustrating a configuration example of the virtual CPE 300. It is only necessary for the virtual CPE 300 to be able to acquire the band value notified from the web server 200, and it is not necessary for the virtual CPE 300 to include the band management DB 311.

The band control function unit 301 controls the communication band for the CPE through rate limiting, shaping, or the like using the band value notified from the web server 200.

Figure 11:
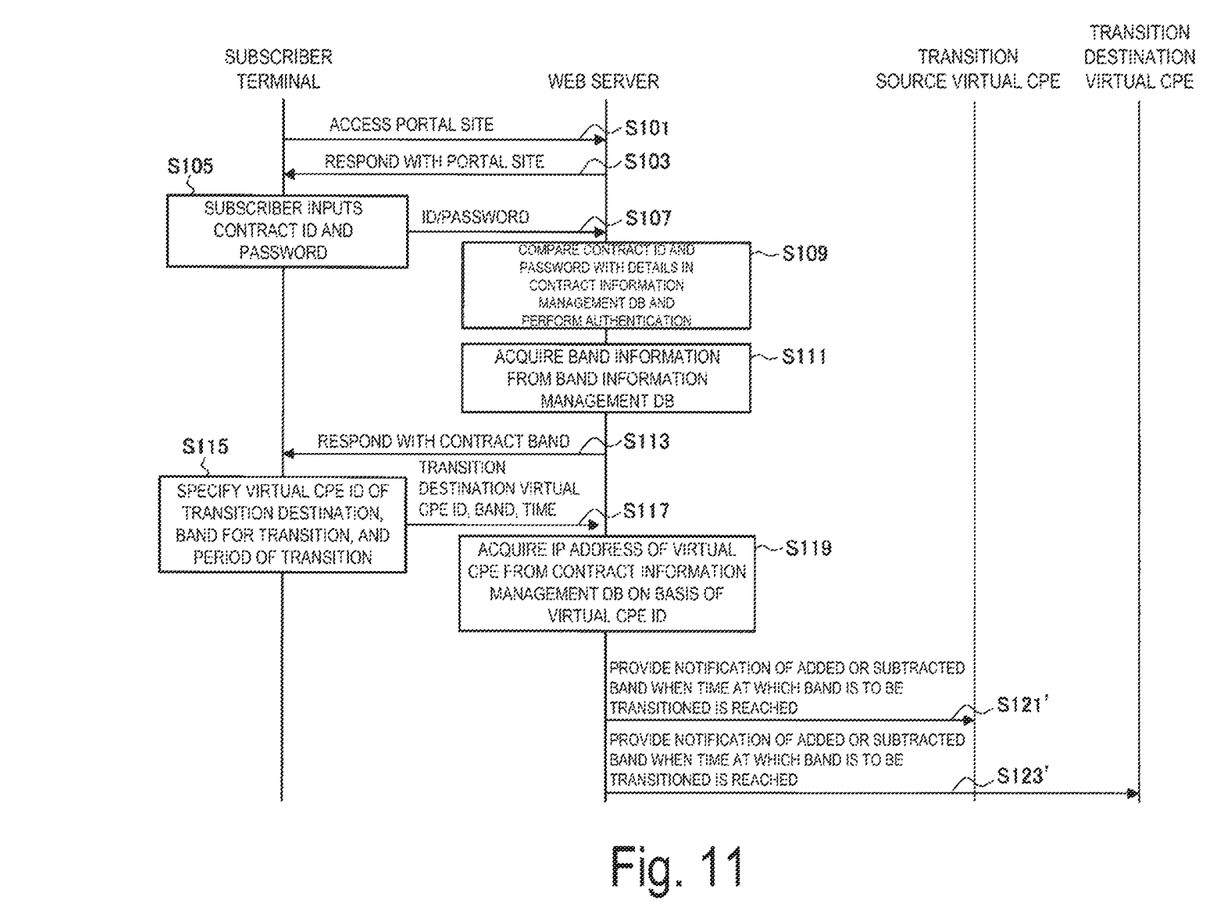
FIG. 11 is a diagram (modification example) illustrating a sequence of operations in the communication system according to the embodiment of the present invention.

FIG. 11 is a diagram illustrating a sequence of operations in the communication system.

Steps S101 to S119 are the same as S101 to S119 in FIG. 8, and Steps S121' and S123' are different from Steps S121 and S123 in FIG. 8. Steps S121' and S123' will be described.

The band specification function unit 203 of the web server 200 calculates a band value, for the virtual CPE that is a transition source, obtained by subtracting the band for transition (band to be deleted) from the contract band and notifies the band value to the virtual CPE that is a transition source using SOAP API or the like when the start time is reached (S121'). The band control function unit 301 that is a transition source controls the communication band using the band value notified from the web server 200. Also, when the end time is reached, the band specification function unit 203 of the web server 200 restores the band value obtained by the addition to the original value and notified to the virtual CPE that is a transition source. The band control function unit 301 of the virtual CPE 300 that is a transition source controls the communication band using the original value notified from the web server 200.

The band specification function unit 203 of the web server 200 calculates a band value obtained by adding the band for transition (band to be added) to the contract band for the virtual CPE that is a transition destination and notifies the band value to the virtual CPE that is a transition destination using SOAP API or the like when the start time is reached (S123'). The band control function unit 301 that is a transition destination controls the communication band using the band value notified from the web server 200. Also, when the end time is reached, the band specification function unit 203 of the web server 200 restores the band value obtained by the addition to the original value and notifies to the virtual CPE that is a transition destination. The band control function unit 301 of the virtual CPE 300 that is a transition destination controls the communication band using the original value notified from the web server 200.

In a case in which the pieces of virtual CPE 300 are disposed in the plurality of virtual CPE servers by the web server 200 performing time management in this manner, it is possible to match addition/deletion timings of the bands even if times of these virtual CPE servers are not synchronized. On the other hand, when it is necessary for the web server 200 to manage start times and end times for a large number of pieces of virtual CPE, it may be necessary to prepare large-scaled servers in accordance with this.

Effects of Embodiments of the Invention

According to the embodiment of the present invention, it is possible to achieve flexible line utilization that enables subscribers to share bands. In a case in which it is desired to use a network in various locations, but it is difficult to maintain wide-area and high-quality services at all the locations, for example, such network utilization that a low-speed service is used and a band is widened as needed can be carried out.

Example of Hardware Configuration

Figure 12:
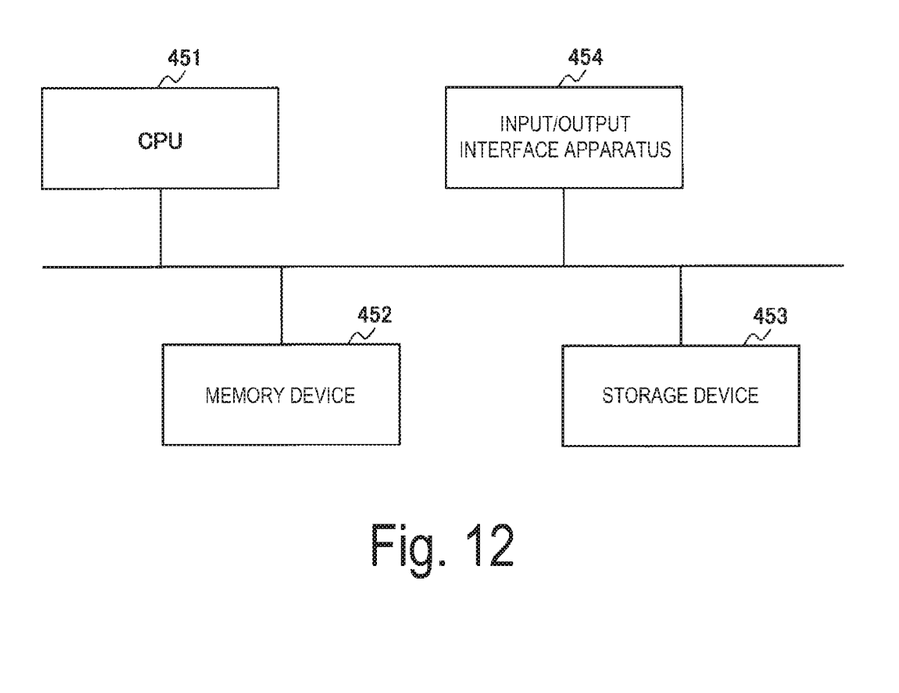
FIG. 12 is a diagram illustrating an example of a hardware configuration of a virtual CPE server according to the embodiment of the present invention.

FIG. 12 shows an example of a hardware configuration of a virtual CPE server 400 according to the embodiment of the present invention. The virtual CPE server 400 may be a computer configured by a processor such as a central processing unit (CPU) 451, a memory device 452 such as a random access memory (RAM) and a read only memory (ROM), a storage device 453 such as a hard disk, and the like. For example, functions and processing of the virtual CPE server 400 are realized by the CPU 451 executing data and programs stored in the storage device 453 or the memory device 452. Also, data input to the virtual CPE server 400 may be performed from an input/output interface apparatus 454, and data output from the virtual CPE server 400 may be performed from the input/output interface apparatus 454.

Note that the Web server 200 can also be realized in a hardware configuration similar to that in FIG. 12.

Supplements

Although the communication system according to the embodiment of the present invention has been described using the functional block diagram for convenience of explanation, the communication system according to the embodiment of the present invention may be implemented by hardware, software, or a combination thereof. For example, the embodiment of the present invention may be implemented by a program that causes a computer to implement functions of each apparatus in the communication system according to the embodiment of the present invention, a program that causes a computer to execute each procedure in the method according to the embodiment of the present invention, and the like. Further, respective functional units may be used in combination, as necessary. Further, the method according to the embodiment of the present invention may be performed in an order that is different from the order described in the embodiment.

Although a method for implementing a flexible change in communication band when a subscriber terminal under control of a certain CPE transitions under control of other CPE has been described, the present invention is not limited to the aforementioned embodiment and can be modified and applied in various manners within the scope of the

REFERENCE SIGNS LIST 200 web server
201 Web Response function unit
203 Band specification function unit
211 Contract information management DB
213 Band information management DB
300 Virtual CPE
311 Band management DB
301 Band control function unit
400 Virtual CPE server

The invention claimed is:

1. A communication system comprising:
a first virtual customer premises equipment (CPE) capable of providing a network function to a first CPE; and
a second virtual CPE capable of providing a network function to a second CPE,
wherein the first virtual CPE comprises:
a band acquisition unit configured to acquire a first contract band set for a first subscriber under control of the first CPE and acquire a value of decrease in the first contract band when at least one subscriber terminal of the first subscriber transitions from being under control of the first CPE to being under control of the second CPE, and
a band control unit configured to control a communication band for the first CPE using a band value obtained by subtracting the value of decrease from the first contract band, and configured to receive a first notification from a server to change the band value of the first contract band when an application start time is reached and a second notification from the server to restore a band value of the first contract band when an application end time is reached, and
wherein the second virtual CPE comprises:
band acquisition unit configured to acquire a second contract band set for a second subscriber under control of the second CPE and acquire a value of increase in the second contract band corresponding to the value of decrease in the first contract band, and
a band control unit configured to control a communication band for the second CPE using a band value obtained by adding the value of increase to the second contract band, wherein the value of increase is determined based on the value of decrease and a service quality associated with the first subscriber under control of the first CPE and a second subscriber under control of the second CPE.

2. The communication system according to claim 1, wherein the band acquisition unit of the first virtual CPE acquires an application period during which the first contract band is changed,
the band acquisition unit of the second virtual CPE acquires an application period during which the second contract band is changed, and
each of the band control units of the first virtual CPE and the second virtual CPE control communication bands in a corresponding application period.

3. The communication system according to claim 1, wherein the band acquisition unit of the first virtual CPE acquires the first contract band from a server configured to manage contract bands and acquires the value of decrease that is input by the first subscriber under control of the first CPE, and
the band acquisition unit of the second virtual CPE acquires the second contract band from a server configured to manage contract bands.

4. A band control method in a communication system including first virtual customer premises equipment (CPE) capable of providing a network function to a first CPE and second virtual CPE capable of providing a network function to a second CPE, the method comprising:
acquiring, at the first virtual CPE, a first contract band set for a first subscriber under control of the first CPE and acquiring a value of decrease in the first contract band when at least one subscriber terminal of the first subscriber transitions from being under control of the first CPE to being under control of the second CPE;
receiving, at the first virtual CPE and from a server, a first notification to change a band value of the first contract band when an application start time is reached;
controlling, at the first virtual CPE, a communication band for the first CPE using the band value obtained by subtracting the value of decrease from the first contract band;
receiving, at the first virtual CPE and from the server, a second notification to restore a band value of the first contract band when an application end time is reached;
acquiring, at the second virtual CPE, a second contract band set for a second subscriber under control of the second CPE and acquiring a value of increase in the second contract band corresponding to the value of decrease in the first contract band; and
controlling, at the second virtual CPE, a communication band for the second CPE using a band value obtained by adding the value of increase to the second contract band, wherein the value of increase is determined based on the value of decrease and a service quality associated with the first subscriber under control of the first CPE and a second subscriber under control of the second CPE.

5. The band control method according to claim 4, further comprising:
acquiring, at the first virtual CPE, an application period during which the first contract band is changed; and
acquiring, at the second virtual CPE, an application period during which the second contract band is changed,
wherein each of the band control unit of the first virtual CPE and the band control unit of the second virtual CPE controls communication bands in a corresponding application period.

6. The band control method according to claim 4,
wherein acquiring, at the first virtual CPE, the first contract band set for the first subscriber under control of the first CPE and acquiring the value of decrease in the first contract band comprises:
acquiring the first contract band from the server configured to manage contract bands and acquiring the value of decrease that is input by the first subscriber under control of the first CPE, and
wherein acquiring, at the second virtual CPE, the second contract band set for the second subscriber under control of the second CPE and acquiring the value of increase in the second contract band corresponding to the value of decrease in the first contract band comprises:
acquiring the second contract band from the server configured to manage contract bands.

* * * * *